United States Patent
Chaganti et al.

(10) Patent No.: US 10,514,907 B2
(45) Date of Patent: Dec. 24, 2019

(54) SYSTEM AND METHOD FOR OUT-OF-THE-BOX SOLUTION-LEVEL MANAGEMENT VIA LOGICAL ARCHITECTURE AWARENESS

(71) Applicant: DELL PRODUCTS L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/938,351

(22) Filed: Mar. 28, 2018

(65) Prior Publication Data

US 2019/0303137 A1    Oct. 3, 2019

(51) Int. Cl.
| | |
|---|---|
| G06F 9/44 | (2018.01) |
| G06F 8/71 | (2018.01) |
| G06F 8/65 | (2018.01) |
| G06F 8/61 | (2018.01) |
| H04L 12/24 | (2006.01) |

(52) U.S. Cl.
CPC ............ *G06F 8/71* (2013.01); *G06F 8/61* (2013.01); *G06F 8/65* (2013.01); *H04L 41/046* (2013.01); *H04L 41/0866* (2013.01); *H04L 41/0893* (2013.01)

(58) Field of Classification Search
CPC ..... G06F 8/65; G06F 8/71; G06F 8/61; H04L 41/046; H04L 41/0866; H04L 41/0893

USPC .................. 717/101–103, 120–123
See application file for complete search history.

(56) References Cited

U.S. PATENT DOCUMENTS

| | | | |
|---|---|---|---|
| 6,317,028 B1 | 11/2001 | Valiulis | |
| 7,103,874 B2 * | 9/2006 | McCollum | G06F 8/36 709/220 |
| 7,222,127 B1 | 5/2007 | Bem et al. | |
| 7,516,362 B2 | 4/2009 | Connelly et al. | |

(Continued)

OTHER PUBLICATIONS

Duncan Tweed, "BMC Atrium Discovery User Guide", 2014, BMC Software, Inc., retrieved from https://bmc.com/, 218 pages. (Year: 2014).*

(Continued)

*Primary Examiner* — Ted T. Vo
(74) *Attorney, Agent, or Firm* — Chamberlain, Hrdlicka, White, Williams & Aughtry

(57) ABSTRACT

A computing device includes user resources and a validation agent. The validation agent identifies a logical group of a solution architecture to which the computing device belongs. The validation agent obtains a baseline configuration associated with the logical group. The validation agent identifies a dependency of the user resources on second user resources of a second computing device of the logical group. The validation agent makes a determination that an override attribute is associated with the second user resources. The validation agent modifies the obtained baseline configuration using the override attribute. The validation agent initiates a modification of the user resources using the modified obtained baseline configuration.

18 Claims, 13 Drawing Sheets

(56) References Cited

U.S. PATENT DOCUMENTS

| | | | |
|---|---|---|---|
| 7,831,693 B2 * | 11/2010 | Lai | G06Q 10/10 706/27 |
| 7,886,031 B1 | 2/2011 | Taylor et al. | |
| 7,987,353 B2 | 7/2011 | Holdaway et al. | |
| 8,166,552 B2 * | 4/2012 | Prafullchandra | G06Q 10/06 726/25 |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,639,798 B2 | 1/2014 | Akiyama et al. | |
| 8,826,077 B2 * | 9/2014 | Bobak | G06F 11/0709 714/26 |
| 8,868,987 B2 | 10/2014 | Wagner | |
| 8,874,892 B1 | 10/2014 | Chan et al. | |
| 8,995,439 B2 | 3/2015 | Field | |
| 9,122,501 B1 | 9/2015 | Hsu et al. | |
| 9,201,751 B1 | 12/2015 | Muthirisavenugopal et al. | |
| 9,278,481 B2 | 3/2016 | Hull | |
| 9,355,036 B2 | 5/2016 | Beard et al. | |
| 9,542,177 B1 | 1/2017 | Johansson et al. | |
| 9,864,634 B2 * | 1/2018 | Kenkre | G06F 9/50 |
| 9,898,224 B1 | 2/2018 | Marshak et al. | |
| 10,057,184 B1 | 8/2018 | Prahlad et al. | |
| 10,097,620 B2 | 10/2018 | Reddy et al. | |
| 2004/0088145 A1 | 5/2004 | Rosenthal | |
| 2004/0177168 A1 | 9/2004 | Alabraba et al. | |
| 2006/0178864 A1 | 8/2006 | Khanijo | |
| 2006/0179116 A1 | 8/2006 | Speeter et al. | |
| 2008/0228755 A1 | 9/2008 | Haga et al. | |
| 2009/0012805 A1 | 1/2009 | Schnell et al. | |
| 2009/0165099 A1 | 6/2009 | Eldar et al. | |
| 2009/0183010 A1 | 7/2009 | Schnell et al. | |
| 2009/0260071 A1 | 10/2009 | Sadovsky et al. | |
| 2010/0024001 A1 | 1/2010 | Campbell | |
| 2011/0078428 A1 | 3/2011 | Hamid | |
| 2011/0093703 A1 | 4/2011 | Etchegoyen | |
| 2012/0041976 A1 | 2/2012 | Annapragada | |
| 2012/0110142 A1 | 5/2012 | Montagna et al. | |
| 2012/0150926 A1 | 6/2012 | Adkins et al. | |
| 2012/0182151 A1 | 7/2012 | Tong | |
| 2012/0331526 A1 | 12/2012 | Caudle et al. | |
| 2014/0069291 A1 | 3/2014 | Yang | |
| 2014/0281675 A1 | 9/2014 | Sreenivasan et al. | |
| 2015/0256394 A1 | 9/2015 | Palmer | |
| 2016/0048611 A1 | 2/2016 | Cox | |
| 2016/0057009 A1 | 2/2016 | Kadayam et al. | |
| 2016/0302323 A1 | 10/2016 | Gosselin | |
| 2017/0094003 A1 | 3/2017 | Gahlot et al. | |
| 2017/0339005 A1 | 11/2017 | Yuan et al. | |
| 2018/0034709 A1 | 2/2018 | Chen et al. | |
| 2018/0285009 A1 | 10/2018 | Guim Bernat et al. | |

OTHER PUBLICATIONS

Duncan Tweed, "Baseline configuration", 2015, BMC Software, Inc., retrieved from https://bmc.com/ , 10 pages (Year: 2015).*

Masoom Parvez, "AutonnaticGroup Node", 2014, BMC Software, Inc., retrieved from https://bmc.com/ , 2 pages (Year: 2014).*

"Integrated Dell Remote Access Controller 8 (iDRAC8)", Version 2.05.05.05 User's Guide, Dell Inc., Dec. 2014 (348 pages).

Iler, Doug, et al., "Introducing iDRAC8 with Lifecycle Controller for Dell 13th Generation PowerEdge Servers", A Dell Deployment and Configuration Guide, Dell Inc., Sep. 2014 (16 pages).

Extended European Search Report issued in corresponding European Application No. 18200661.9 dated Apr. 1, 2019. (9 pages).

Extended European Search Report issued in corresponding European Application No. 19151952.9, dated Jul. 1, 2019.

"Dell EMC OpenManage Essentials Version 2.3: User's Guide"; XP055602720; Oct. 1, 2017; https://topics-cdn.dell.com/pdf/openmanage-essentials-v23 users-guide en-us.pdf.

"Dell Drag—Wikipedia"; XP055602141; Mar. 23, 2018; https://en.wikipedia.org/w/index.php?title=Dell_DRAC&oldid=831957421.

Extended European Search Report issued in corresponding European Application No. 19165339.3, dated Aug. 6, 2019.

Extended European Search Report issued in corresponding European Application No. 19165337.7, dated Aug. 28, 2019.

* cited by examiner

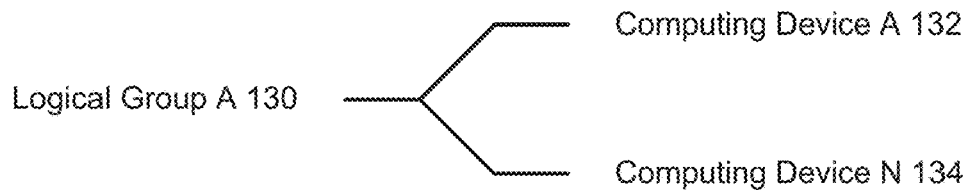
FIG. 1B
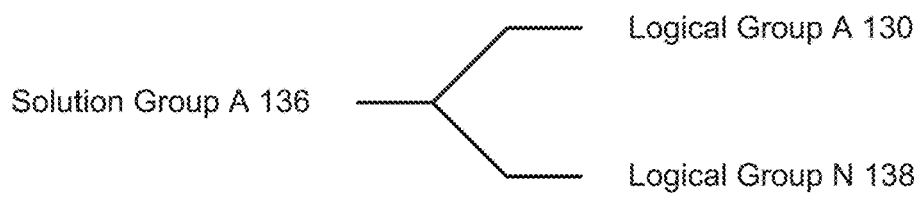
FIG. 1C
Computing Device A 132 → Computing Device B 137
FIG. 1D
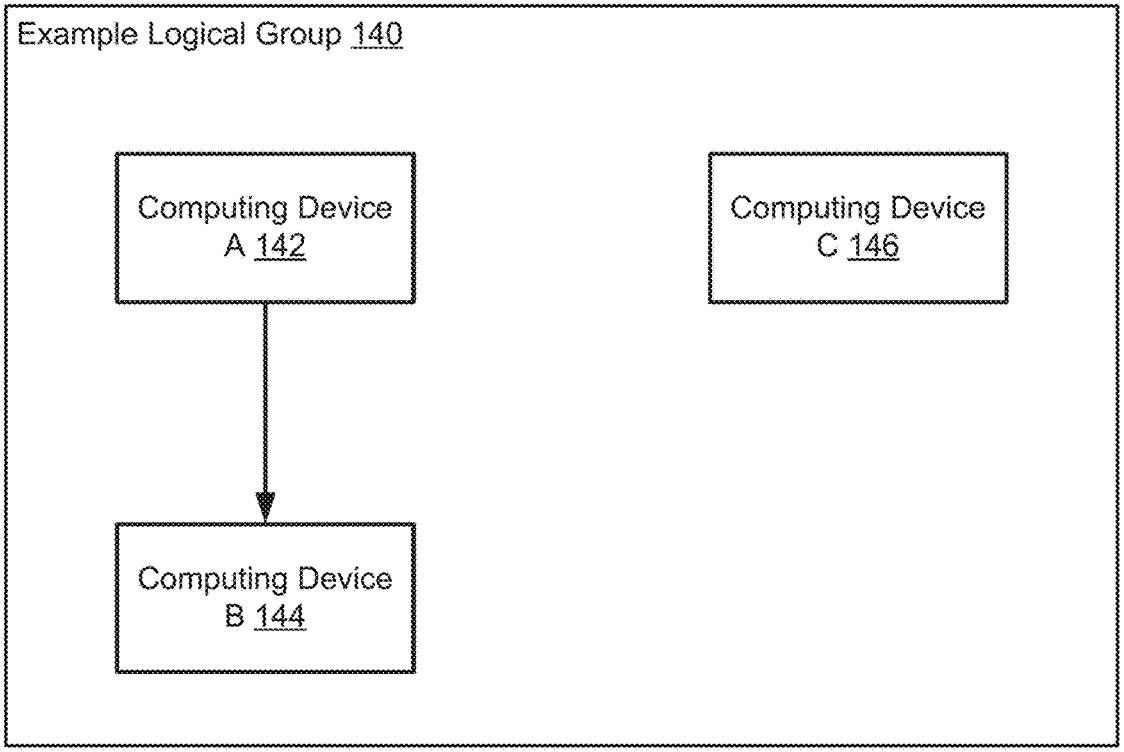
FIG. 1E

US 10,514,907 B2

SYSTEM AND METHOD FOR OUT-OF-THE-BOX SOLUTION-LEVEL MANAGEMENT VIA LOGICAL ARCHITECTURE AWARENESS

BACKGROUND

Computing devices may include any number of internal components such as processors, memory, and persistent storage. Each of the internal components may operate with other components of the computing devices. For example, some processors store generated data in a persistent storage and may utilize capacity of the memory to perform computations.

In a network environment, multiple computing devices may cooperate to accomplish a task. For example, multiple computing devices may perform different computations that may be used, in turn, to generate a final result.

SUMMARY

In one aspect, a computing device in accordance with one or more embodiments of the invention includes user resources and a validation agent. The validation agent is programmed to identify a logical group of a solution architecture to which the computing device belongs; obtain a baseline configuration associated with the logical group; identify a dependency of the user resources on second user resources of a second computing device of the logical group; make a determination that an override attribute is associated with the second user resources; modify the obtained baseline configuration using the override attribute; and initiate a modification of the user resources using the modified obtained baseline configuration.

In one aspect, a method for deploying a solution architecture in accordance with one or more embodiments of the invention includes identifying a baseline configuration for a first computing device of the solution architecture; enforcing the baseline configuration on the first computing device; identifying an override attribute associated with a second computing device of the solution architecture; updating the baseline configuration based on the override attribute; enforcing the updated baseline configuration on the first computing device; and enforcing the updated baseline configuration on the second computing device.

In one aspect, a non-transitory computer readable medium in accordance with one or more embodiments of the invention includes computer readable program code, which when executed by a computer processor enables the computer processor to perform a method for deploying a solution architecture. The method includes identifying a baseline configuration for a first computing device of the solution architecture; enforcing the baseline configuration on the first computing device; identifying an override attribute associated with a second computing device of the solution architecture; updating the baseline configuration based on the override attribute; enforcing the updated baseline configuration on the first computing device; and enforcing the updated baseline configuration on the second computing device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1B shows a diagram of a first relationship in accordance with one or more embodiments of the invention.

FIG. 1C shows a diagram of a second relationship in accordance with one or more embodiments of the invention.

FIG. 1D shows a diagram of a third relationship in accordance with one or more embodiments of the invention.

FIG. 1E shows a diagram of an example logical group in accordance with one or more embodiments of the invention.

DETAILED DESCRIPTION

Figure 1A:
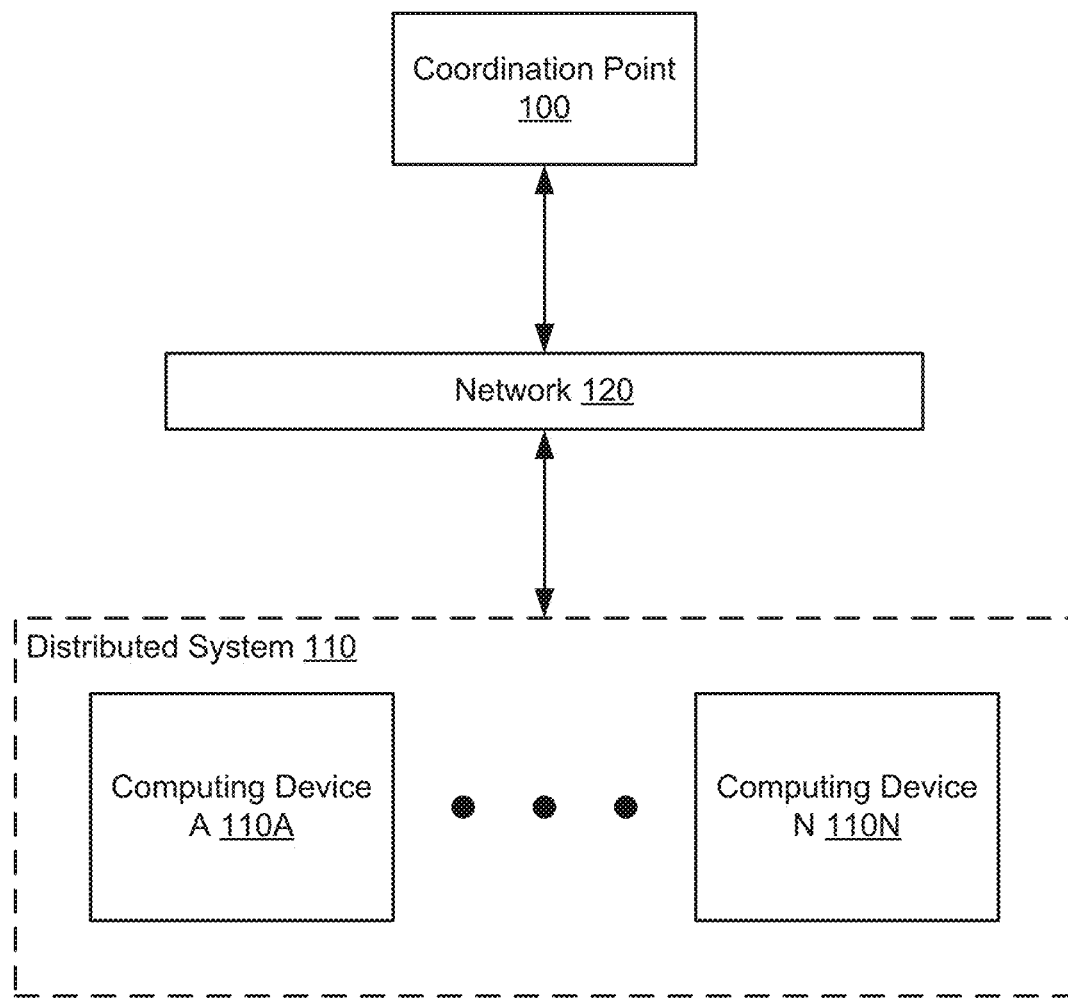
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for orchestrating the organization of computing resources in a network environment. More specifically, a distributed system may include any number of computing devices that are orchestrated to accomplish a goal. To organize the computing devices of the distributed system, embodiments of the invention may provide a method of configuring the computing devices.

In one or more embodiments of the invention, the computing devices may be organized into logical groups. Each of the logical groups may include a group of computing devices that are not functionally dependent, i.e., functionally independent, on any of the other logical groups. Each of the logical groups may include computing devices that operate cooperatively to perform a desired function. For example, multiple computing devices may provide data storage functionality but each computing device of the logical group may not be independently capable of providing the data storage functionality.

As used herein, functionally dependent means that operation of computing devices depends on the operation of other computing devices. In other words, a computing device is functionally dependent on another computing device if the computing device cannot perform its function in the absence of the second computing device. For example, as will be discussed in greater detail below, in some embodiments of the invention a first computing device may rely on the storage resources of a second computing device to perform its function of storing data.

In one or more embodiments of the invention, the logical groups may specify functional dependencies between computing devices of the respective logical groups. For example, a logical group may include two computing devices and specify that a second computing device is functionally dependent on a second computing device.

In one or more embodiments of the invention, a distributed system enforces dynamically determined configurations of user resources of computing devices based on respective memberships of the computing devices in logical groups and/or dependencies of the respective computing devices of the logical groups. By enforcing dynamically determined configurations, the distributed system may adapt to changes in the physical topology of the distributed system and/or facilitates deployment of the distributed system.

As used herein, user resources refer to computing resources of a computing device that are allocated to facilitate the completion of user directed tasks, i.e., to execute user applications. User resources may include, but are not limited to, hardware components, firmware, configurations, and/or applications.

In one or more embodiments of the invention, computing resources refer to processor computing cycles, communication bandwidth, memory bandwidth, persistent storage input-output cycles, and/or memory storage capacity or persistent storage capacity. Memory may be provided by, for example, random access memory. Persistent storage may be provided by, for example, a solid state hard disk drive. Processor computing cycles may be provided by, for example, a central processing unit. Communication bandwidth may be provided by, for example, a network interface card. Computing resources may be other types of resources used in the operation of computing devices without departing from the invention.

In one or more embodiments of the invention, the distributed system may enforce configuration of the user resources using an embedded device hosted by a computing device that operates independently from the computing device. By enforcing the configurations using an independently operated computing device, one or more embodiments of the invention may prevent a user, or other entity, from modifying the configuration of the user resources such that it deviates from the enforced configuration.

FIG. 1A shows a system in accordance with one or more embodiments of the invention. The system may include a distributed system (110) and a coordination point (100). In one or more embodiments of the invention, the coordination point (100) may initiate functions of validation agents (not shown) of computing devices (110A, 110N) of the distributed system (110) to enforce configurations on the computing device (110A, 110N). By initiating the functions of the validation agents, the computing devices (110A, 110N) may be placed into a state where groups of the computing devices operate cooperatively to provide group level functionality. In other embodiments of the invention, the validation agents of the computing device (110A, 110N) may self-initiate functions to enforce configurations on the computing device (110A, 110N). By self-initiating the functions of the validation agents, the computing devices (110A, 110N) may be placed into a state where groups of the computing devices operate cooperatively to provide group level functionality. The coordination point (100) and distributed system (110) may be operably connected by a network (120). The system may include additional, fewer, and/or different components without departing from the invention. Each component of the system is discussed below.

In one or more embodiments of the invention, the coordination point (100) initiates functions of the validation agents of the computing devices (110A, 110N) of the distributed system (110). The coordination point (100) may initiate the functions of the validation agents to orchestrate a deployment, orchestrate a modification, e.g., addition/removal, of the computing devices (110A, 110N), and/or ensure the computing devices continue to have predetermined configurations over time. The functions of the validation agents initiated by the coordination point (100) may be used to determine whether a current configuration of user resources of a computing device complies with a dynamically determined configuration for the user resources. If the current configuration of the user resources does not comply, the functions of the validation agents may be initiated by the coordination point (100), or the validation agents themselves, to enforce a dynamically determined configuration for the user resources.

For example, over time the components of a computing device may change due to breakage, upgrading, user intervention, or other causes. When initially deployed, the computing devices (110A, 110N) may each have a configuration that meets a predetermined configuration. Changes to the computing devices over time may cause the user resources of the computing devices to no longer have a current configuration that meets configuration requirements. The components of the computing device include, but are not limited to, hardware components, firmware, firmware settings, and applications.

The coordination point (100) may be any entity operably connected to the validation agent of a computing device. While the coordination point (100) in FIG. 1A is illustrated as being separate from the distributed system (110), the coordination point (100) may be a component of the distributed system (110), may be the computing device hosting the validation agent, or another component of the system of FIG. 1A without departing from the invention.

In one or more embodiments of the invention, the coordination point (100) is implemented as a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the coordination point (100) described in this application and/or perform the method illustrated in FIGS. 5-7. For additional details regarding a computing device, see FIG. 8.

In one or more embodiments of the invention, the distributed system (110) orchestrates the operation of computing devices (110A, 110N) to accomplish goals. The goals may be, for example, to store data, to provide stored data, or to perform computations on stored data. The distributed system (110) may be, for example, a computer cluster. While the distributed system (110) is illustrated as only include computing devices (110A, 110N), the distributed system (110) may include other components such as switches, routers, network attached storage, or other devices without departing from the invention. The other components (not shown) may provide operable connections between computing devices of the distributed system (110).

In one or more embodiments of the invention, the distributed system (110) orchestrates the operation of the computing devices (110A, 110N) by configuring all or a portion of the computing devices (110A, 110N). The computing devices (110A, 110N) may be configured by loading computing instructions on persistent storage of the respective computing devices (110A, 110N) that are executed by processors of the respective computing devices. The computing devices (110A, 110N) may be configured by other methods such as, for example, disabling hardware components, changing configuration settings, and/or loading different versions of firmware than that already present on the computing devices without departing from the invention. Each of the computing devices (110A, 110N) may be configured to perform similar or different functions without departing from the invention.

In one or more embodiments of the invention, groups of computing devices are configured to cooperatively perform a function. For example, to configure a group of computing devices of the distributed system (110) to provide storage services the system may configure: (i) a first computing device to segment to-be-stored data, (ii) a second computing device to compute fingerprints of the segments of the to-be-stored data, (iii) a third computing device to determine whether the fingerprints of the segments of the data match fingerprints of already stored segments, and (iv) a fourth computing device to store the segments of the data having associated fingerprints that do not match fingerprints of already stored segments of data. Thus, any number of computing devices (110A, 110N) may be configured to perform different tasks to accomplish a goal. The computing devices (110A, 110N) may be divided into any number of groupings and may perform any number of different or similar functions without departing from the invention. For additional details regarding the computing devices (110A, 110N), See FIG. 2.

In one or more embodiments of the invention, the configuration for each computing device may be dynamically determined based on logical groups of computing devices and dependencies of the computing devices within each logical grouping. For additional details regarding logical groupings and dependencies, See FIGS. 1B-1F.

In one or more embodiments of the invention, each logical group may have an associated baseline configuration. The baseline configuration may specify the hardware, software (e.g., firmware and/or applications), and configurations of the hardware and software of user resources of a computing device. The baseline configuration may be enforced on all computing devices of the logical group.

In one or more embodiments of the invention, the baseline configuration may be partially overridden based on dependencies of computing devices within a respective logical group. In other words, a baseline configuration may be modified based on the dependencies of the computing devices. As will be discussed in greater detail with respect to FIGS. 1B-1F, the system may ensure the functionality of functionally dependent computing devices is provided by ensuring the uniformity of configuration of multiple computing devices.

In one or more embodiments of the invention, the network (120) operably connects the coordination point (100) to the distributed system. The network (120) may be any type of communication link that includes any combination of wires and/or wireless connections. The network (120) may be, for example, a local area network connected to the Internet which, in turn, is operably connected to the distributed system. Other communication topologies may be used to facilitate communication between the coordination point (100) and the distributed system (110) without departing from the invention.

While the system of FIG. 1A has been illustrated as including a limited number of components for the sake of brevity, the system may include additional components (not shown), fewer components (not shown), and/or different components (not shown), without departing from the invention.

As discussed above, the computing devices (110A, 110N) may be divided into logical groups. Each of the logical groups may also include dependencies within the logical groups. In one or more embodiments of the invention, a dependency is a relationship between at least two computing devices. The relationship may specify that a first computing device is functionally dependent on a second computing device. In such a scenario, any computing device that is functionally dependent on a second computing device may adopt any override parameters of the second computing device to ensure that the functionality of both computing devices is not degraded by incompatibility issues cause by a difference in configurations. Thus, in one or more embodiments of the invention, a system may modify a baseline configuration enforced on any computing devices of a logical group based on the dependencies within the logical group.

Figure 1F:
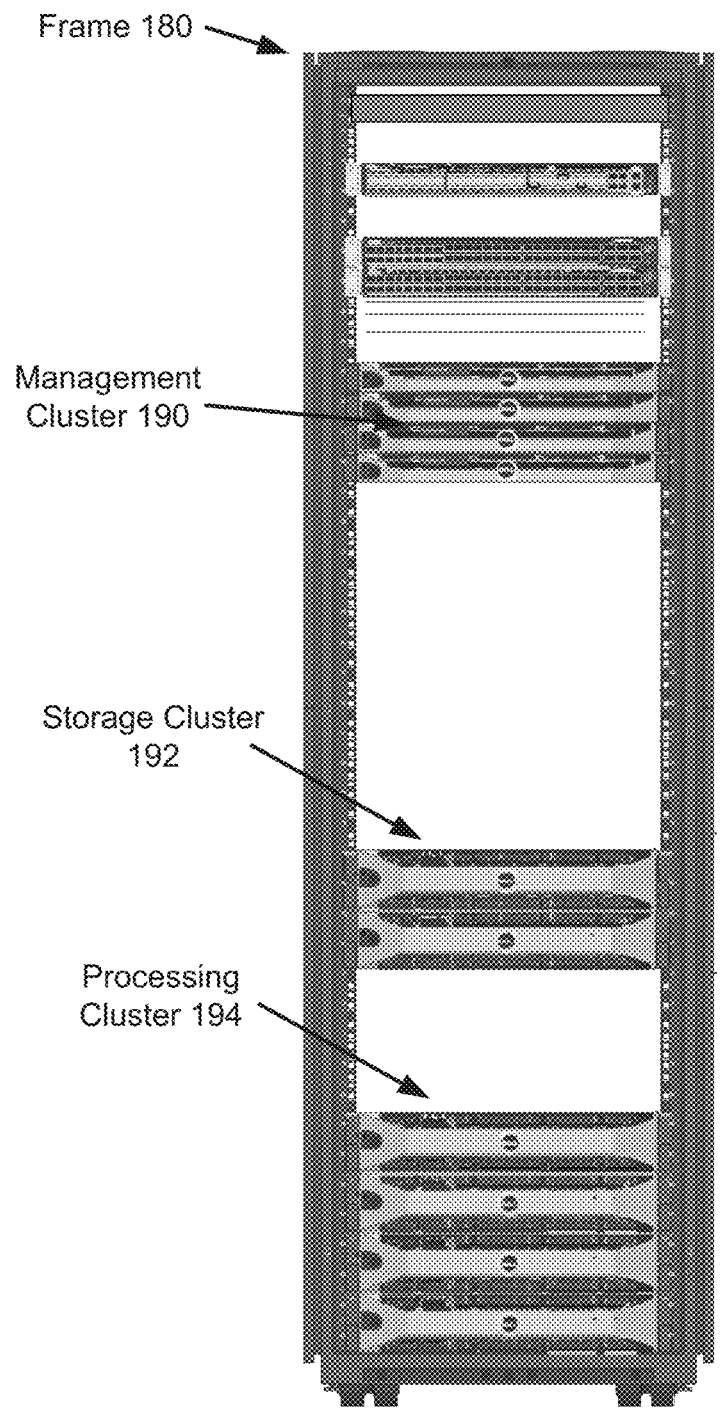
FIG. 1F shows a diagram of an example distributed system in accordance with one or more embodiments of the invention.

To further clarify the relationships between logical groups and dependencies, FIGS. 1B-1E show relationship diagrams illustrating logical groupings and dependencies in accordance with one or more embodiments of the invention. Additionally, FIG. 1F shows an example of a system to further clarify the relationships between logical groups and dependencies.

FIG. 1B shows a first relationship diagram in accordance with one or more embodiments of the invention. In the first relationship diagram, a relationship between a logical group A (130) and multiple computing devices (132, 134) is shown. As seen from the diagram, a logical group (e.g., 130) may include any number of computing devices (e.g., 132, 134).

FIG. 1C shows a second relationship diagram in accordance with one or more embodiments of the invention. In the second relationship diagram, a relationship between a solution group A (136) and multiple logical groups (130, 138) is shown. As seen from the diagram, a solution group (e.g., 136) may include any number of logical groups (e.g., 130, 138). As discussed above, a distributed system may be subdivided into any number of logical groups to orchestrate the operation of the distributed system. Each of the logical groups may be members of a solution group or members of multiple solution groups. Each of the solution groups may provide or define a functionality provided by the respective solution group and the logical group members of the respective solution group may provide or define portion of the functionality of the solution group.

FIG. 1D shows a third relationship diagram in accordance with one or more embodiments of the invention. In the third relationship diagram, a dependency between a computing device A (132) and computing device B (137) is shown. As seen from the diagram, the computing device A (132) depends on the operation of computing device B (137). Accordingly, to ensure proper operation of computing device B (137) in one or more embodiments of the invention the system may modify a baseline configuration enforced on computing device A (132) to incorporate any override parameters associated with computing device B (137). As will be discussed in greater detail below, the override parameters may be derived from, for example, a difference between the baseline configuration and a configuration of the computing device on which a second computing device depends.

FIG. 1E shows a diagram an example logical group (140) in accordance with one or more embodiments of the invention. In the diagram, the example logical group (140) includes three computing devices (142, 144, 146). The computing devices within the logical group also include a dependency of computing device A (142) on computing device B (144). Neither computing device B (144) nor computing device C (146) are functionally dependent on any other computing device. In such a scenario, a baseline configuration would be enforced on computing device C (146) and a modified baseline configuration would be enforced on computing devices A and B (142, 144) to ensure that any override parameters associated with computing device B (144) are taken into account during the configuration of the computing devices.

To further clarify the relationships logical groups and dependencies, FIG. 1F shows an example of a computing system in accordance with one or more embodiments of the invention. The example computing system includes a frame (180) for holding multiple computing devices. The frame (180) holds three computing devices (190, 192, 194). Each of the three computing devices (190, 192, 194) are a part of a logical group and cooperate to provide a predetermine functionality. The three computing devices include a management cluster (190), a storage cluster (192) and a processing cluster (194), e.g., a hyper converged compute cluster.

To provide the predetermined functionality, the management cluster (190) depends on the storage cluster (192) for data storage services. In other words, the management cluster (190) does not include sufficient data storage computing resources and relies on the storage cluster (192) to provide data storage services for the management cluster (190) to operate. Thus, in the example system of FIG. 1F, the logical group includes all three computing devices (190, 192, 194) with the management cluster (190) being functionally dependent on the storage cluster (192).

In such an example scenario, a baseline configuration would be enforced on the processing cluster (194) and a modified baseline configuration reflecting any override parameters associated with the storage cluster (192) would be enforced on both of the management cluster (190) and the storage cluster (192). The override parameters associated with the storage cluster (192) may be, for example, a firmware version for a chipset that facilitates communication between the storage cluster (192) and other computing devices. By applying the modified baseline configuration to both of the storage cluster (192) and the management cluster (190), a system in accordance with embodiments of the invention may ensure that each of the aforementioned components have a common, predetermined configuration that reduces/eliminates that potential for compatibility issues between the computing devices.

Figure 2:
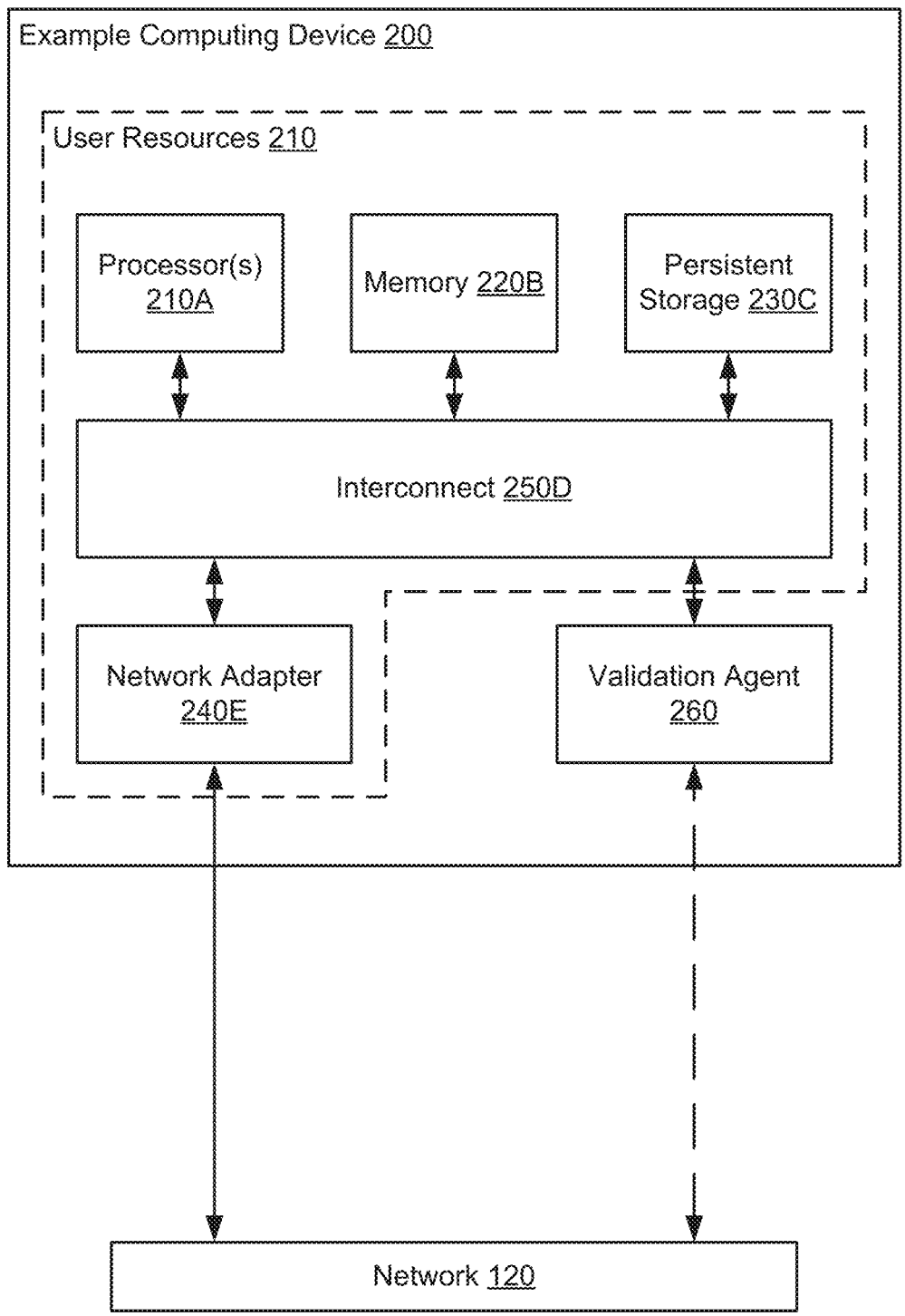
FIG. 2 shows a diagram of an example computing device hosting a validation agent in accordance with one or more embodiments of the invention.

As discussed above, configuration may be enforced on the computing devices of the distributed system (e.g., 100, FIG. 1A). FIG. 2 shows a diagram of an example computing device (200) in accordance with one or more embodiments of the invention. The computing devices (e.g., 110A, 110N, FIG. 1A) of the distributed system (e.g., 110, FIG. 1A) may be similar to the example computing device (200).

In one or more embodiments of the invention, the example computing device (200) performs operations as part of a distributed system. For example, the example computing device (200) may run software, e.g., applications, deployed to the example computing device (200) that facilitates one or more functions of the distributed system.

In one or more embodiments of the invention, the example computing device (200) includes a mechanism for enforcing a configuration of the example computing device (200). The configuration may specify the type and/or version of hardware components of the example computing device (200) and/or drivers, or other software elements used to operate hardware components, executing and/or stored on the example computing device (200). By enforcing a configuration on the example computing device (200), the likelihood of compatibility issues or other problems that may negatively impact the ability of the example computing device (200) or other computing devices from cooperatively performing predetermined functionality may be decreased.

In one or more embodiments of the invention, the example computing device (200) may provide mechanisms for executing customized processes and/or storing data by a remote user without impacting a local user's use of the example computing device (200). As used herein, a local user refers to an owner or operator of the example computing device (200). As used herein, a remote user refers to a third party.

To provide the above noted functionality, in one or more embodiments of the invention, the example computing device (200) includes user resources (210) and a validation agent (260). The user resources (210) may be controlled by a local user and the validation agent may be controlled by a remote user.

In one or more embodiments of the invention, the user resources (210) include processor(s) (210A), memory (220B), persistent storage (230C), a network adapter (240E), and an interconnect (250D).

The processor(s) (210A) may be, for example, central processing units, microcontrollers, or embedded computing devices such as digital signal processors, field programmable gate arrays, or application specific integrated circuits. The processors(s) (210A) maybe other types of digital processing devices without departing from the invention. Additionally, the processor(s) (210A) may execute program code stored in the persistent storage (230C) or other storages to run user applications.

The memory (220B) may be volatile memory such as, for example, dynamic random access memory or static random access memory. The memory (220B) may be non-volatile memory such as, for example, flash memory. The memory (210B) maybe other types of digital memory without departing from the invention.

The persistent storage (230C) may store data and may be, for example, hard disk drives, solid state drives, tape drives, or any combination thereof. The persistent storage (230C) may be other types of digital storage without departing from the invention. A solid state drive may provide a high performance data storage. A high performance data storage may provide a higher read/write rate than a lower performance data storage. A tape drive, hard disk drive, or other magnetic media may provide a low performance data storage. Additionally, the persistent storage (230C) may store program code for user applications.

The network adapter (240E) may connect the example computing device (200) to the network (120) or other computing devices and may be, for example, a network interface controller. The network adapter (240E) may be other types of devices for providing a network interface without departing from the invention.

The interconnect (250D) may provide operable connections between the other components of the user resources and may be, for example, memory controllers, communication busses, and/or chipsets for providing inter-component communications. The chipsets may include a BIOS or other software for initializing and/or providing hardware access services to user application. The interconnect (250D) may be other types of hardware devices for providing communications between components without departing from the invention. Additionally, the interconnect (250D) may also be operably connected to the validation agent.

For the sake of brevity, the user resources (210) have been illustrated as including a limited number of hardware components. However, the user resources (210) may include any type and/or quantity of hardware components without departing from the invention.

In addition to the aforementioned hardware components, the user resources (210) may also include drivers, driver settings, or other software for controlling hardware components of the user resources (210).

In one or more embodiments of the invention, the validation agent (260) enforces a configuration on the user resources (210). The enforcement may include: (i) obtaining a current configuration of the user resources (210), (ii) determining whether the current configuration matches a predetermined configuration, and (iii) modifying the user resources, based on the determination, to enforce the predetermined configuration on the user resources (210). In addition, the validation agent (260) may include separate computing resources for executing application invoked by remote users.

In one or more embodiments of the invention, the validation agent (260) is controlled by a remote user via an operable connection. The validation agent (260) may advertise an internet protocol address, or other identifier, on a network that is separate from the internet protocol address of the example computing device (200). Thus, the validation agent (260) may distinguish itself from the example computing device (200) in the network environment and thereby enable other entities to address network (120) traffic to the validation agent (260). In one or more embodiments of the invention, the validation agent (260) is controlled by a coordination point.

In one or more embodiments of the invention, the validation agent (260) cooperatively interacts with other validation agents (not shown) of other computing devices (not shown) to enforce predetermined configurations on all or a portion of the computing devices. For example, each of the validation agents may exchange information regarding the computing devices hosting the respective validation agents to organize themselves into logical groups. Based on the self-organization into groups, the validation agents may determine configurations to be enforced on each of the computing devices.

In one or more embodiments of the invention, the validation agent includes a network adapter than is separate from the network adapter (240E) of the user resources (210), as illustrated by the dashed arrow between the validation agent and the network (120) in FIG. 2. By including a separate network adapter, the validation agent (260) may communicate via the network (120) without utilizing the network adapter (240E) of the user resources (210). In one or more embodiments of the invention, the validation agent may utilize the network adapter (240E) of the user resources (210) via the interconnect (250D). Thus, in some embodiments of the invention, the validation agent (260) does not include a separate network adapter. For additional details regarding the validation agent (260), See FIG. 3.

While the example computing device (200) of FIG. 2 has been illustrated as including a limited number of components for the sake of brevity, the example computing device (200) may include additional components (not shown), fewer components (not shown), and/or different components (not shown), without departing from the invention. For example, the example computing device (200) may include user interface components, video processors, power supplies, or any other type of component operably connectable to the example computing device (200). Additionally, while illustrated as a single device, the example computing device (200) may be implemented as a logical device that utilizes the computing resources of one or more physical devices without departing from the invention.

Additionally, while the validation agent (260) has been described as being a hardware device, the validation agent (260) may be implemented as a logical device without departing from the invention. For example, the validation agent (260), or a portion of its functionality, may be provided by utilizing computing resources of the user resources (210).

Figure 3:
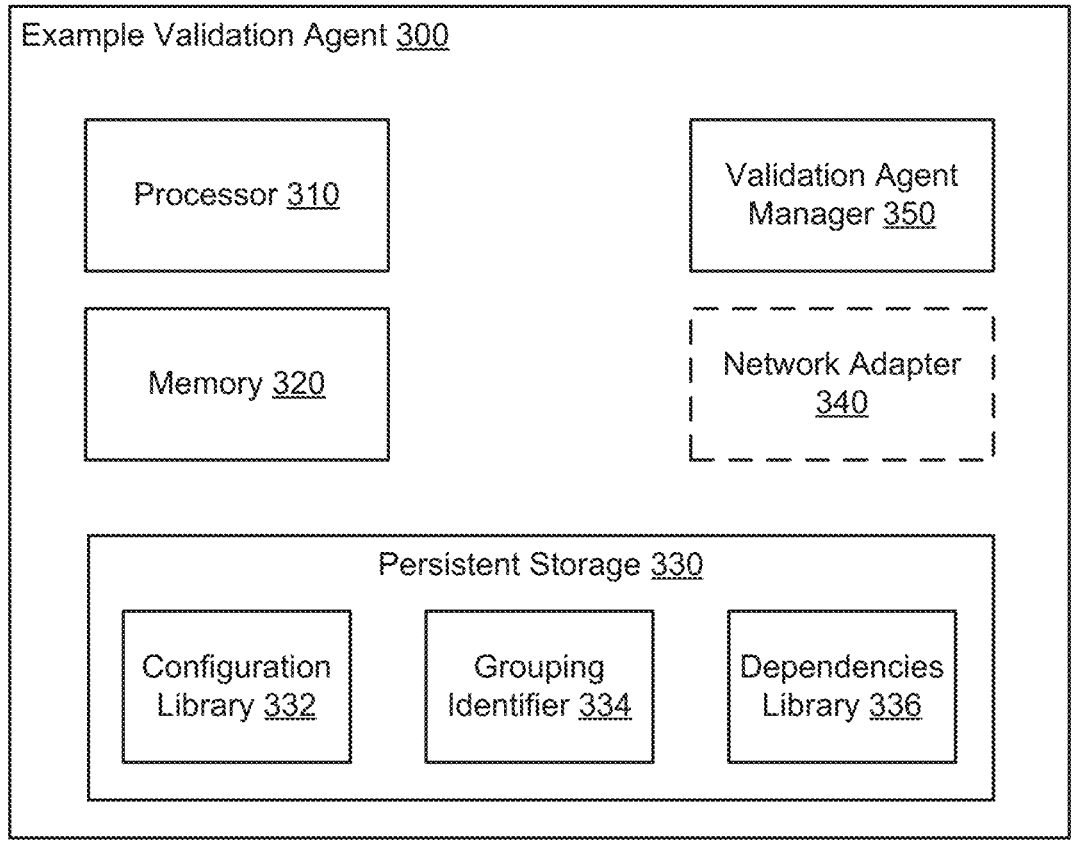
FIG. 3 shows a diagram of an example validation agent in accordance with one or more embodiments of the invention.

FIG. 3 shows a diagram of an example validation agent (300) in accordance with one or more embodiments of the invention. The validation agent (260, FIG. 2) of the example computing device (200, FIG. 2) may be similar to the example validation agent (300).

In one or more embodiments of the invention, the example validation agent (300) is a hardware device adapted to be hosted by a computing device. In one or more embodiments of the invention, hosted by means to be a separate physical distinguishable part of a device. The device may supply power, or provide other services, to the distinguishable part.

In one or more embodiments of the invention, the example validation agent (300) includes computing resources for performing operations. The computing resources may enable the example validation agent (300) to perform computations, store data, or perform other functions without utilizing the device hosting the example validation agent (300). Additionally, the computing resources of the example validation agent (300) may enable the example validation agent (300) to operate independently of a host computing device.

In one or more embodiments of the invention, the example validation agent (300) may be controlled by a remote user. The remote user may cause the example validation agent (300) to perform operations without invocation by a local user of the computing device hosting the example validation agent (300).

In one or more embodiments of the invention, the example validation agent (300) operably connects to a host computing device via an interconnect of the host or other internal communication system of the host computing system. The example validation agent (300) may issue commands to components of user resources of the host computing system without the commands being invoked by a local user. Thus, the example validation agent (300) may cause the user resources of the host computing system to perform operations, send data, or perform other functions without notifying the local user.

In one or more embodiments of the invention, the example validation agent (300) may enforce a configuration on a host computing device. For example, the example validation agent (300) may disable/enable hardware components, load firmware, modify firmware settings, and/or load/disable applications of the host computing device.

In one or more embodiments of the invention, the example validation agent (300) may obtain a configuration to be enforced on a host computing device from a remote user. The obtain configuration may specify any number of configuration elements to be enforced on the host computing device.

To provide the aforementioned functionality, in one or more embodiments of the invention, the example validation agent (300) includes one or more of a processor (e.g., 310), memory (320), persistent storage (330), a network adapter (340), and a validation agent manager (350). The example validation agent (300) may include additional components without departing from the invention. In some embodiments of the invention, the example validation agent (300) may not include a network adapter (340). Each component of the example validation agent (300) is discussed below.

The processor (310) may be, for example, a central processing unit, a microcontroller, or embedded computing devices such as a digital signal processor, a field programmable gate array, or an application specific integrated circuit. The processors (310) may be other types of digital processing devices without departing from the invention. Additionally, the processor (310) may execute program code (not shown) stored in the persistent storage (330) or other storages to remote user applications.

The memory (320) may be volatile memory such as, for example, dynamic random access memory or static random access memory. The memory (320) may be non-volatile memory such as, for example, flash memory. The memory (320) maybe other types of digital memory without departing from the invention.

The persistent storage (330) may store data and may be/include, for example, hard disk drives, solid state drives, tape drives, or any combination thereof. The persistent storage (330) may be/include other types of digital storage devices without departing from the invention. Additionally, the persistent storage (330) may store data structures including a configuration library (332), grouping identifiers (334), and/or dependencies libraries (336). The configuration library (332), grouping identifiers (334), and/or dependencies libraries (336) may be used by the validation agent manager (350) when enforcing a configuration of user resources of a host computing device.

The configuration library (332) may include configuration information associated with logical groups. For example, the configuration library (332) may include any of specifications for hardware, firmware, configuration settings, and/or applications of the user resources of a host computing device associated with respective logical groups. The aforementioned specifications for a logical group may form a baseline configuration for the respective logical group.

The grouping identifier (334) may include information used to identify computing devices that are members of logical groups. The information used to identify computing devices may be, for example, groups of uniform resource indicators associated with computing devices, naming conventions enforced on computing devices, and/or dynamically identified groups of computing devices that have similar characteristics.

In one or more embodiments of the invention, the grouping identifier (334) may specify groups of identifiers. Each identifier may be associated with a different computing device. The identifiers included in the respective groups of identifiers may identify computing devices of respective logical groups.

In one or more embodiments of the invention, the grouping identifier (334) may specify naming conventions used to group computing devices. For example, each computing device may be named based on a logical grouping. For example, a computing device may be given a name such as, for example, "manager—logical group A" to indicate that the computing device is a member of logical group A. Each of the computing devices may be given names in accordance with the naming conventions to enable members of logical groups to be identified based on the names of the computing devices.

The dependencies library (336) may include information used to identify functional dependencies between computing devices of logical groups. The dependencies library (336) may specify, for example, the functional dependencies between computing devices of each logical group.

While illustrated in FIG. 3 as being separate data structures stored on a persistent storage (330) of the example validation agent (300), the configuration library (332), grouping identifiers (334), and/or dependencies library (336) may be divided into any number of portions, combined with other data, and/or stored all or in part in other locations without departing from the invention.

In one or more embodiments of the invention, the network adapter (340) connects the example validation agent (300) to a network or other computing devices and may be, for example, a network interface controller. The network adapter (340E) may be other types of devices for providing a network interface without departing from the invention. In FIG. 3, the network adapter (340) is illustrated in dashing to indicate that it is not present in some embodiments of the invention. As discussed with respect to FIG. 2, in some embodiments of the invention, a validation agent (e.g., 300)

may utilize a network adapter of a host computing device to communicate with other devices via a network.

In one or more embodiments of the invention, the validation agent manager (350) initializes and/or orchestrate the operation of the example validation agent (300) and may be implemented using, for example, memory controllers, communication busses, and/or chipsets for providing inter-component communications and/or orchestration. The chipsets may include a BIOS or other software for initializing and/or providing hardware access services to application. The validation agent manager (350) may be implemented using other types of hardware devices for providing communications between components and/or orchestration without departing from the invention.

In one or more embodiments of the invention, the validation agent manager (350): (i) identifies a logical group to which a computing device hosting the example validation agent (300) belongs, (ii) identifies a baseline configuration using the identified logical grouping, (iii) modifies the baseline configuration based on functional dependencies of the host computing device, and/or (iv) enforces the modified baseline configuration on the user resources of the host computing device. The validation agent manager (350) may provide less, additional, and/or different functionality without departing from the invention. In one or more embodiments of the invention, the validation agent manager (350) may perform all or a portion of the methods illustrated in FIGS. 4A-4D.

While the example validation agent (300) has been described as a physical device, the example validation agent (300) may be implemented as computing instructions performed by a processor of a computing device without departing from the invention. For example, a host computing device may be executing a hypervisor running two virtual machines. A first virtual machine may execute user applications and the second virtual machine may perform the functions of the example validation agent (300).

While the example validation agent (300) of FIG. 3 has been illustrated as including a limited number of components for the sake of brevity, the example validation agent (300) may include additional components (not shown), fewer components (not shown), and/or different components (not shown), without departing from the invention. Additionally, while illustrated as a single device, the example validation agent (300) may be implemented as a logical device that utilizes the computing resources of one or more physical devices without departing from the invention.

Figure 4:
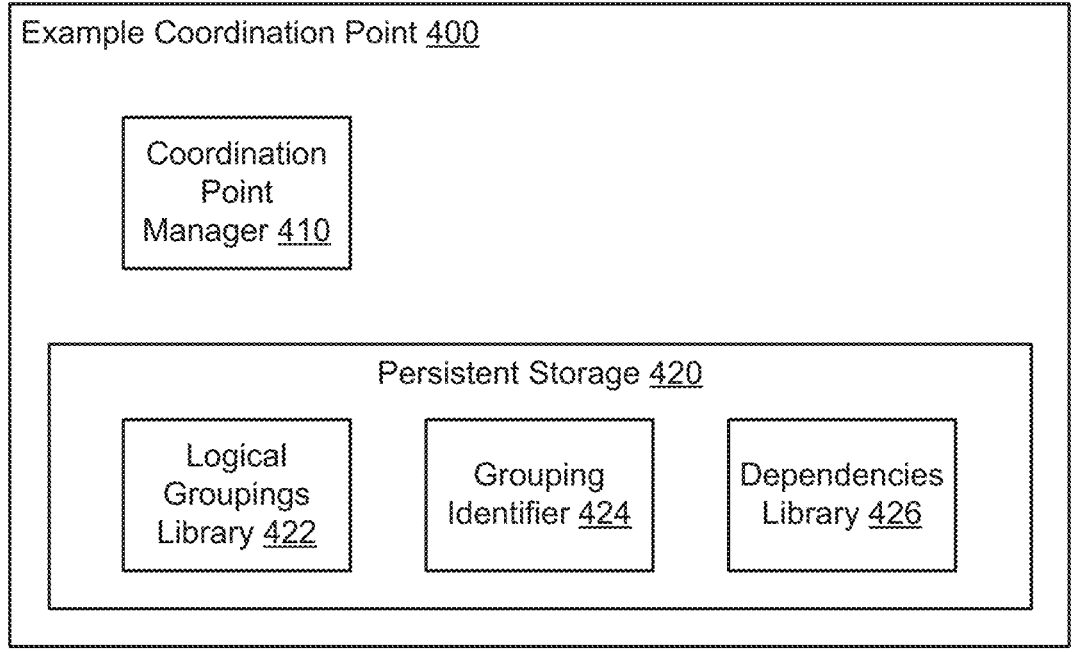
FIG. 4 shows a diagram of an example coordination point in accordance with one or more embodiments of the invention.

As discussed with respect to FIG. 1A, in one or more embodiments of the invention a coordination point may be used to enforce configurations on user resources of computing devices. FIG. 4 shows a diagram of an example coordination point (400) in accordance with one or more embodiments of the invention.

The example coordination point (400) may: (i) identify logical groupings of computing devices, (ii) generate configurations to be enforced on each of the computing devices, and (iii) initiate enforcement of the configurations on the computing devices. The example coordination point (400) may initiate the enforcement of the configurations by sending the configurations to respective validation agents of the computing devices. In other words, the example coordination point (400) my generate configurations and send the generated configurations to validation agents for enforcement on host computing devices. The example coordination point (400) may provide less, additional, and/or different functionality without departing from the invention. In one or more embodiments of the invention, the example coordination point (400) may perform all or a portion of the methods illustrated in FIGS. 5-7.

To provide the aforementioned functionality, the example coordination point (400) may include a coordination point manager (410) and a persistent storage (420). The coordination point manager (410) may perform all or a portion of the methods illustrated in FIGS. 5-7.

In one or more embodiments of the invention, the functionality of the coordination point manager (410) is provided by any combination of hardware components, firmware, and/or software instructions, e.g., applications. The hardware components may include circuitry. The software instructions may be executed by the hardware components and may cause the hardware components to provide the functionality of the coordination point manager (410) described throughout this application.

The persistent storage (420) may store data and may be/include, for example, hard disk drives, solid state drives, tape drives, or any combination thereof. The persistent storage (420) may be/include other types of digital storage devices without departing from the invention. Additionally, the persistent storage (420) may store data structures including a configuration library (422), grouping identifiers (424), and/or dependencies libraries (426). The configuration library (422), grouping identifiers (424), and/or dependencies libraries (426) may be used by the coordination point manager (410) when generating a configuration to be enforced on a computing device.

The configuration library (422) may include configuration information associated with logical groups. For example, the configuration library (422) may include any of specifications for hardware, firmware, configuration settings, and/or applications of the user resources of a host computing device associated with respective logical groups. The aforementioned specifications for a logical group may form a baseline configuration for the respective logical group.

The grouping identifier (424) may include information used to identify computing devices that are members of logical groups. The information used to identify computing devices may be, for example, groups of uniform resource indicators associated with computing devices, naming conventions enforced on computing devices, and/or dynamically identified groups of computing devices that have similar characteristics.

In one or more embodiments of the invention, the grouping identifier (424) may specify groups of identifiers. Each identifier may be associated with a different computing device. The identifiers included in the respective groups of identifiers may identify computing devices of respective logical groups.

In one or more embodiments of the invention, the grouping identifier (424) may specify naming conventions used to group computing devices. For example, each computing device may be named based on a logical grouping. For example, a computing device may be given a name such as, for example, "manager—logical group A" to indicate that the computing device is a member of logical group A. Each of the computing devices may be given names in accordance with the naming conventions to enable members of logical groups to be identified based on the names of the computing devices.

The dependencies library (426) may include information used to identify functional dependencies between computing devices of logical groups. The dependencies library (426) may specify, for example, the functional dependencies between computing devices of each logical group.

While illustrated in FIG. 4 as being separate data structures stored on a persistent storage (420) of the example coordination point (400), the configuration library (422), grouping identifiers (424), and/or dependencies library (426) may be divided into any number of portions, combined with other data, and/or stored all or in part in other locations without departing from the invention.

Figure 5:
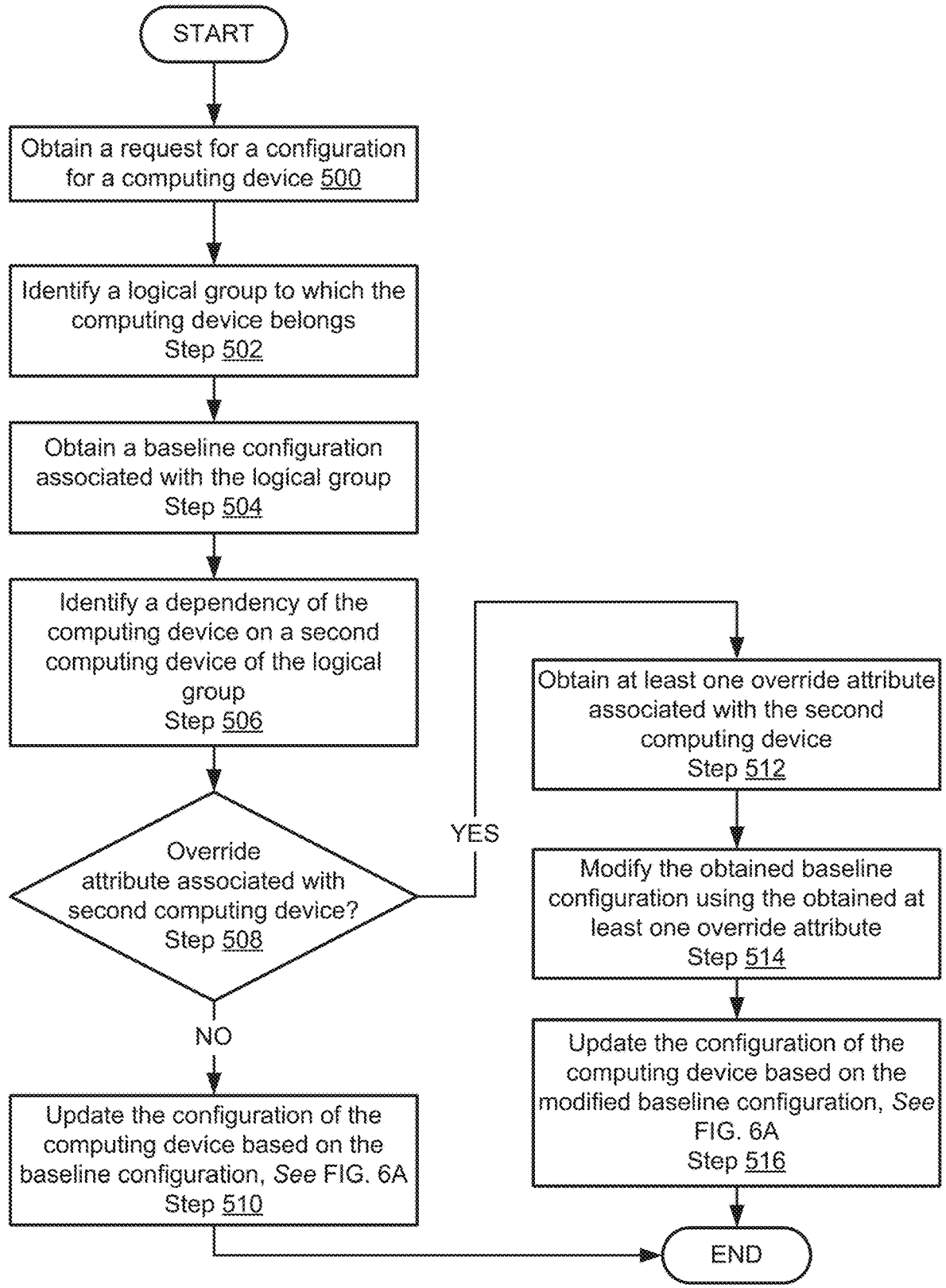
FIG. 5 shows a diagram of a flowchart of a method of configuring a computing device in accordance with one or more embodiments of the invention.

As discussed above, the system shown in FIG. 1A may automatically configure computing devices of a distributed system by enforcing configuration on the computing devices. FIG. 5 shows a method in accordance with one or more embodiments of the invention that may be performed by, for example, the example validation agent (300, FIG. 3) or the example coordination point (400, FIG. 4).

FIG. 5 shows a flowchart of a method in accordance with one or more embodiments of the invention. The method depicted in FIG. 5 may be used to update the configuration of a computing device in accordance with one or more embodiments of the invention. The method shown in FIG. 5 may be performed by, for example, an example validation agent (300, FIG. 3) or an example coordination point (400, FIG. 4). Other component of the system illustrated in FIG. 1A may perform the method of FIG. 5 without departing from the invention.

In Step 500, a request for a configuration for a computing device is obtained.

In one or more embodiments of the invention, the request for the configuration specifies a grouping identifier, e.g., an identifier of the computing device. The grouping identifier may be used to identify a logical group to which the computing device belongs.

In Step 502, a logical group to which the computing device belongs is identified.

In one or more embodiments of the invention, the logical group is identified using the grouping identifier of Step 500. The logical group may be identified by matching the grouping identifier of Step 500 to a logical grouping. The logical grouping may specify grouping identifiers of each member of the logical group. Thus, matching the grouping identifier to a grouping identifier of the logical group may identify the logical group to which the computing device belongs.

In Step 504, a baseline configuration associated with the logical group is obtained.

In one or more embodiments of the invention, the obtained baseline configuration specifies hardware, firmware, firmware settings, and applications for user resources of computing devices.

In Step 506, a dependency of the computing device on a second computing device of the logical group is identified. The dependency may be a functional dependency.

In one or more embodiments of the invention, the dependency specifies a relationship between the computing device and the second computing device. The relationship may indicate that the computing device depends on the second computing device for the computing device to perform one or more of its functions. The relationship may be, for example, reliance on the second computing device for storage services, computing services, or any other type of service.

In one or more embodiments of the invention, the dependency is identified by matching and identifier, or other information associated with the computing device, to a library of dependencies (e.g., 336, FIG. 3). The library of dependencies may include dependencies of all computing devices of all logical groups. The identifier of the computing device may map the computing device to the second computing device in the dependencies library and, therefore, enable the dependency of the computing device on the second computing device to be identified.

In Step 508, it is determined whether an override attribute is associated with the second computing device.

The override attribute may specify a deviation from, e.g., may be in conflict with, the baseline configuration. The deviation may a difference from the hardware, firmware, firmware settings, or applications specified by the baseline configuration.

If an override attribute is associated with the second computing device, the method may proceed to Step 512. If an override attribute is not associated with the second computing device, the method may proceed to Step 510.

In Step 510, the configuration of the computing device is updated based on the baseline configuration.

Updating the baseline configuration of the computing device may cause hardware component(s) to be enabled/disabled, firmware to be loaded, firmware settings to be changed, and/or applications to be loaded/disabled to configure the user resources of the computing device to match the baseline configuration.

Figure 6A:
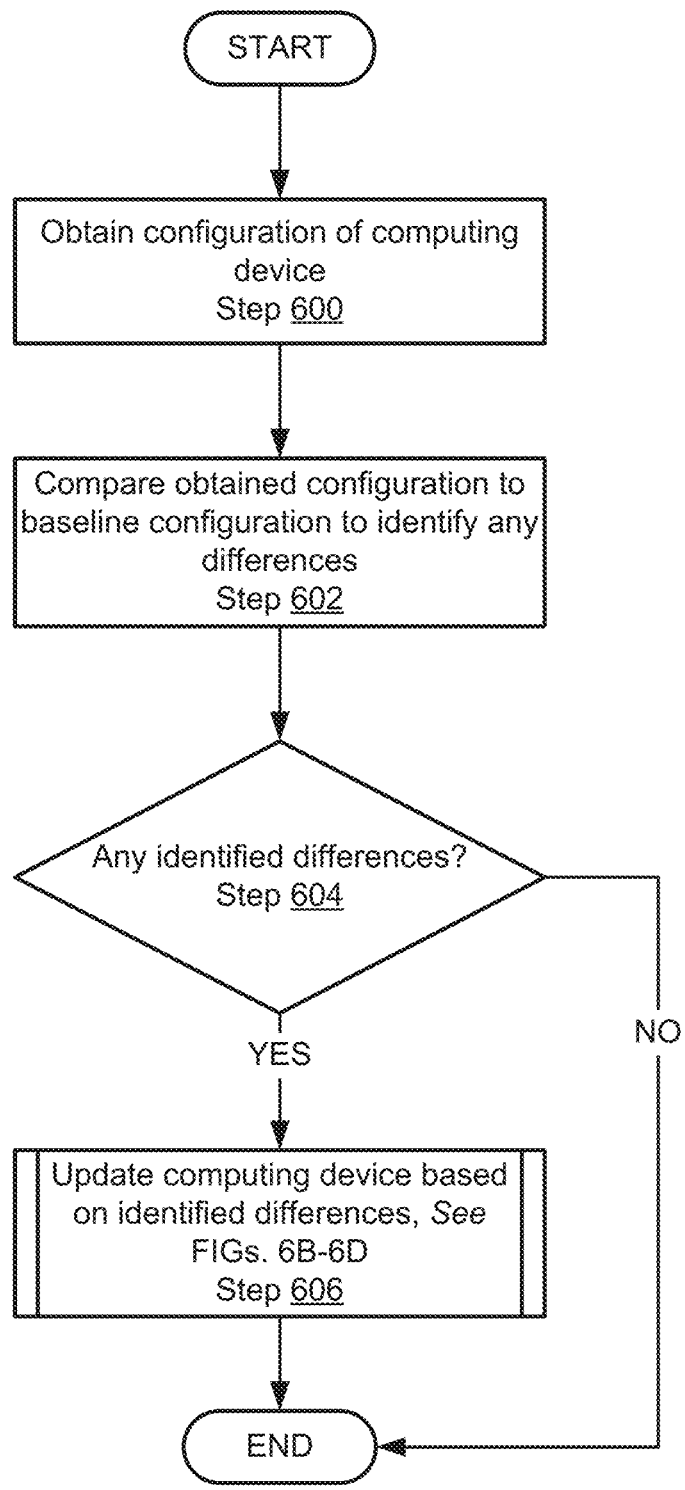
FIG. 6A shows a diagram of a flowchart of a method of updating a computing device in accordance with one or more embodiments of the invention.

In one or more embodiments of the invention, the configuration of the computing device is updated based on the baseline configuration via the method shown in FIG. 6A. The configuration of the computing device may be updated based on the baseline configuration using other methods without departing from the invention.

Returning to Step 508, the method may proceed to Step 512 if an override attribute is associated with the second computing device.

In Step 512, at least one override attribute associated with the second computing device is obtained.

In one or more embodiments of the invention, the at least one override attribute is obtained by comparing the configuration of the second computing device to the baseline configuration. Any differences identified by the comparison may be used as the at least one override attribute. In other words, any configurations of the second computing device that are different from the configurations specified by the baseline configuration may be used as override attributes. In other words, the override attribute may be a difference between a resource of the user resources and the baseline configuration. User resources may include any number of resources, e.g., hardware components, firmware, firmware settings, applications, and application settings.

In one or more embodiments of the invention, the at least one override attribute is obtained by retrieving the override attribute from the second computing device. For example, a validation agent of the second computing device may store the at least one override attribute and may provide the at least one override attribute in response to requests from other entities.

The at least one override attribute may be obtained from other entities without departing from the invention. For example, the at least one override attribute may be stored in a data structure of another computing device that provides the at least one override attribute in response to requests.

In Step 514, the obtained baseline configuration is modified using the obtained at least one override attribute.

In one or more embodiments of the invention, the obtained baseline configuration is modified by replacing configurations of the baseline configuration with corresponding override parameters. For example, a software version of a driver in a baseline configuration may be replaced with a different software version of the driver specified by the override parameters. The obtained baseline configuration may be modified by replacing any number of configurations of the obtained baseline configuration with any number of override parameters without departing from the invention. The modified baseline configuration may be referred to as an updated baseline configuration.

In Step 516, the configuration of the computing device is updated based on the modified obtained baseline configuration.

Updating the baseline configuration of the computing device may cause hardware component(s) to be enabled/disabled, firmware to be loaded, firmware settings to be changed, and/or applications to be loaded/disabled to configure the user resources of the computing device to match the modified obtained baseline configuration.

In one or more embodiments of the invention, the configuration of the computing device is updated based on the modified obtained baseline configuration via the method shown in FIG. 6A. The configuration of the computing device may be updated based on the modified obtained baseline configuration using other methods without departing from the invention.

The method may end following Step 516.

FIG. 6A shows a flowchart of a method in accordance with one or more embodiments of the invention. The method depicted in FIG. 6A may be used to update the configuration of a computing device in accordance with one or more embodiments of the invention. The method shown in FIG. 6A may be performed by, for example, an example validation agent (300, FIG. 3). Other component of the system illustrated in FIG. 1A may perform the method of FIG. 6A without departing from the invention.

In Step 600, a configuration of a computing device is obtained.

The configuration of the computing device may be obtained by reading the configurations of the user resources of the computing device.

In Step 602, the obtained configuration is compared to a baseline configuration to identify any differences between the obtained configuration and the baseline configuration.

As discussed with respect to FIG. 5, the baseline configuration may be that associated with a logical group, e.g., Step 510, or may be a modified baseline configuration if override parameters are associated with a second computing device from which the computing device depends, e.g., Step 516.

In one or more embodiments of the invention, multiple differences are identified. The multiple difference may include hardware, firmware, firmware settings, applications, and/or application setting differences. The difference may include any number and combination of differences without departing from the invention.

In Step 604, it is determined with any differences were identified in Step 602.

If any differences were identified in Step 602, the method proceeds to Step 606. If no differences were identified in Step 602, the method may end.

In Step 606, the computing device is updated based on the identified differences.

In one or more embodiments of the invention, the computing device is updated by modifying hardware, firmware, firmware settings, applications, and/or application setting of user resources of the computing device to conform each of the aforementioned user resources to match the baseline configuration of Step 602. A validation agent of the computing device may enforce the baseline configuration on the user resources of the computing device.

Figure 6B:
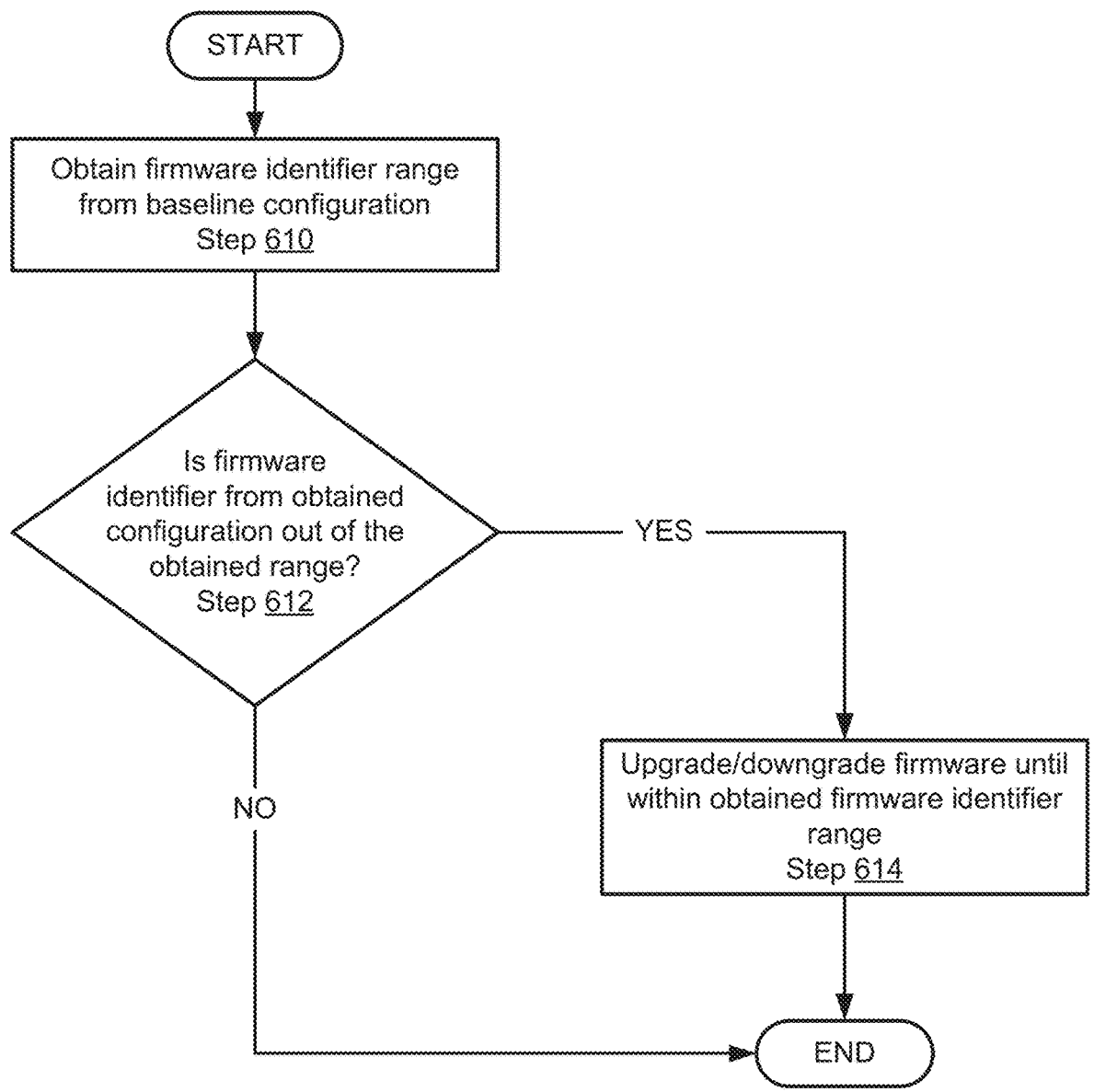
FIG. 6B shows a diagram of a flowchart of a method of configuring firmware in accordance with one or more embodiments of the invention.
Figure 6C:
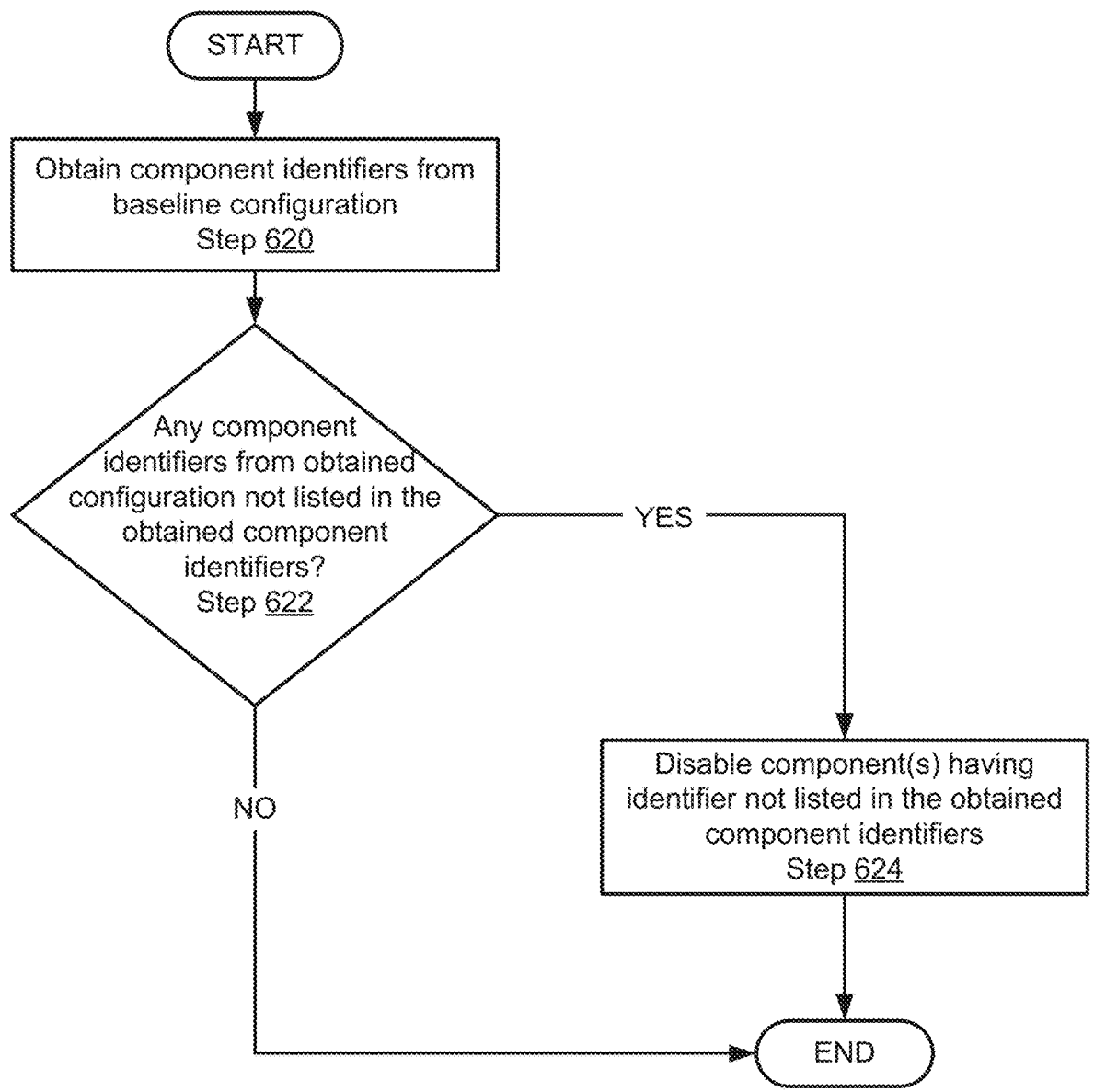
FIG. 6C shows a diagram of a flowchart of a method of configuring hardware in accordance with one or more embodiments of the invention.
Figure 6D:
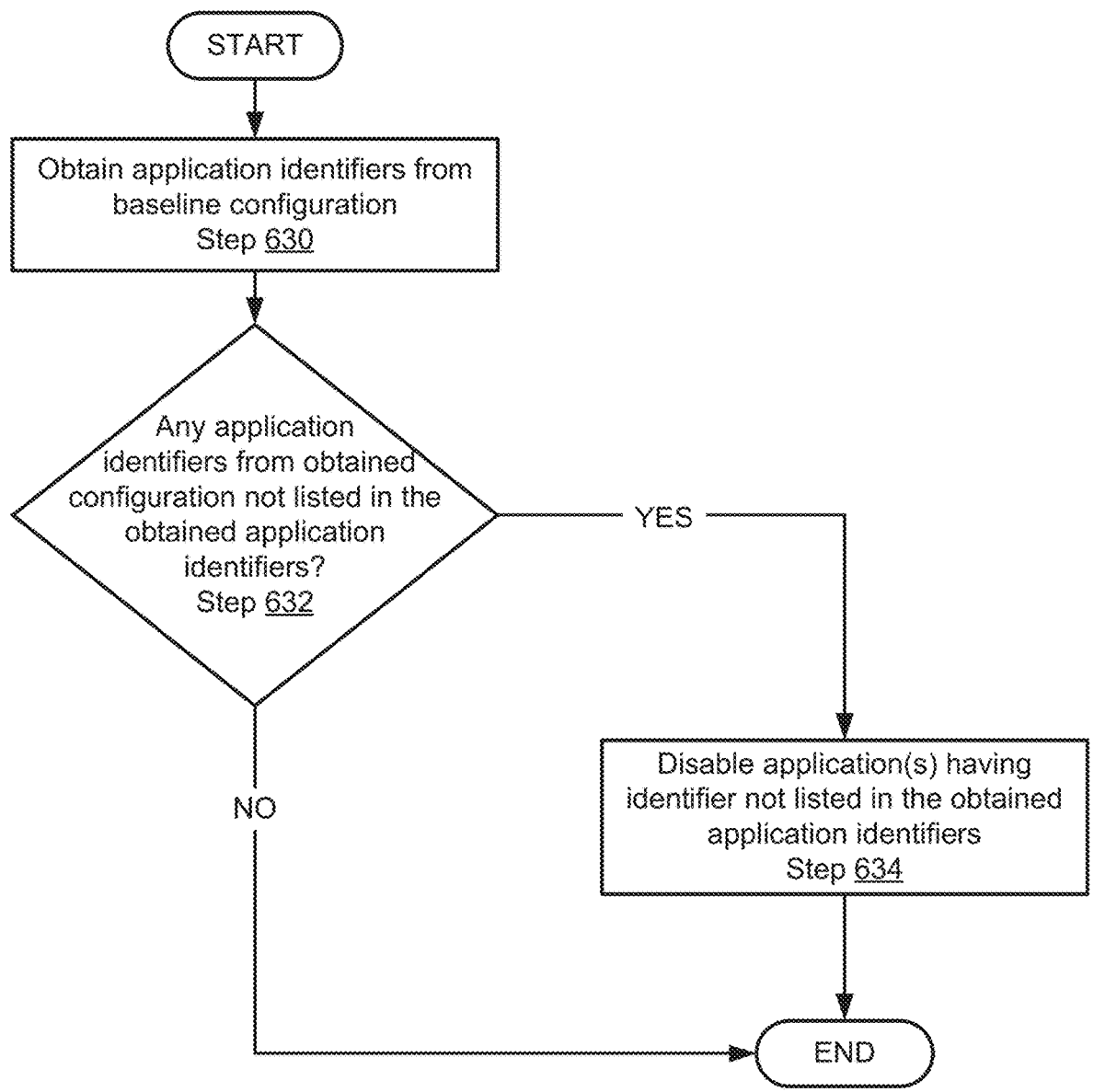
FIG. 6D shows a diagram of a flowchart of a method of configuring applications in accordance with one or more embodiments of the invention.

In one or more embodiments of the invention, the user resources of the computing device are updated via one or more of the methods illustrated in FIGS. 6B-6D. The user resources of the computing device may be updated via other methods without departing from the invention.

The method may end following Step 606.

FIG. 6B shows a flowchart of a method in accordance with one or more embodiments of the invention. The method depicted in FIG. 6B may be used to update the configuration of a computing device in accordance with one or more embodiments of the invention. The method shown in FIG. 6B may be performed by, for example, an example validation agent (300, FIG. 3). Other component of the system illustrated in FIG. 1A may perform the method of FIG. 6B without departing from the invention.

In Step 610, a firmware identifier range is obtained from the baseline configuration.

In one or more embodiments of the invention, the firmware identifier range is a range of version numbers of a firmware present in the user resources of the computing device. The firmware identifier range may include identifiers, e.g., version numbers, of firmware within the range. In other words, the firmware identifier range may specify members of a group. The firmware identifier range may specify any number of member of a group at any level of granularity without departing from the invention. For example, the firmware identifier range may specify a maximum and minimum version number that indicate all version numbers between the maximum and minimum are within the firmware identifier range. In another example, the firmware identifier may specify a maximum version number indicating that all version numbers less than the maximum version number are within the firmware identifier range. In a still further example, the firmware identifier range may specify excluded member of the group and, consequently, indicate that all other version numbers of software are members of the group.

In Step 612, it is determined whether a firmware identifier of an obtained configuration of user resources of a computing device is outside of the obtained firmware identifier range.

If the obtained firmware identifier of the obtained configuration of user resources of the computing device is outside of the obtained firmware identifier range, the method proceeds to Step 614. If the obtained firmware identifier of the obtained configuration of user resources of the computing device is inside of the obtained firmware identifier range, e.g., a member of the group specified by the firmware identifier range, the method may end following Step 612.

In Step 614, the firmware is upgraded/downgraded until the version number of the firmware is within, e.g., a member of the group, the obtained firmware identifier range.

The firmware may be upgraded/downgraded by loading a different version of the firmware in the user resources and/or deleting the firmware from the user resources.

The method may end following Step 614.

FIG. 6C shows a flowchart of a method in accordance with one or more embodiments of the invention. The method depicted in FIG. 6C may be used to update the configuration of a computing device in accordance with one or more embodiments of the invention. The method shown in FIG. 6C may be performed by, for example, an example validation agent (300, FIG. 3). Other component of the system illustrated in FIG. 1A may perform the method of FIG. 6C without departing from the invention.

In Step 620, component identifiers are obtained from the baseline configuration.

In one or more embodiments of the invention, the component identifiers are identifiers of hardware components of user resources of a computing device. The hardware components may be, for example, a storage disk, a processor, memory, network interface adapters, or other physical components.

In Step 622, it is determined whether any component identifiers from an obtained configuration of a computing device are not listed in the obtained component identifiers.

If the component identifiers from the obtained configuration of the computing device are not listed in the obtained component identifiers, the method proceeds to Step 624. If the component identifiers from the obtained configuration of the computing device are listed in the obtained component identifiers, the method may end following Step 622.

In Step 624, the hardware component(s) having identifiers not listed in the obtained component identifiers are disabled.

In one or more embodiments of the invention, the hardware component(s) of the user resources of the computing device are disabled by a validation agent of the computing device. The validation agent may disable the hardware component(s) without communicating with the user resources. In other words, the validation agent may act without the consent of the user resources of the computing device.

The method may end following Step 624.

FIG. 6D shows a flowchart of a method in accordance with one or more embodiments of the invention. The method depicted in FIG. 6D may be used to update the configuration of a computing device in accordance with one or more embodiments of the invention. The method shown in FIG. 6D may be performed by, for example, an example validation agent (300, FIG. 3). Other component of the system illustrated in FIG. 1A may perform the method of FIG. 6D without departing from the invention.

In Step 630, application identifiers are obtained from the baseline configuration.

In one or more embodiments of the invention, the application identifiers are identifiers of applications of user resources of a computing device. The applications may be, for example, a database service, a networking service, or a communications process. The applications may be other types of applications without departing from the invention.

In Step 632, it is determined whether any application identifiers from an obtained configuration of a computing device are not listed in the obtained application identifiers.

If the application identifiers from the obtained configuration of the computing device are not listed in the obtained application identifiers of the baseline configuration, the method proceeds to Step 634. If the application identifiers from the obtained configuration of the computing device are listed in the obtained application identifiers of the baseline configuration, the method may end following Step 632.

In Step 634, the application(s) having identifiers not listed in the obtained application identifiers of the baseline configuration are disabled.

In one or more embodiments of the invention, the application(s) of the user resources of the computing device are disabled by a validation agent of the computing device. The validation agent may disable the application(s) without communicating with the user resources. In other words, the validation agent may act without the consent of the user resources of the computing device.

The method may end following Step 634.

Figure 7:
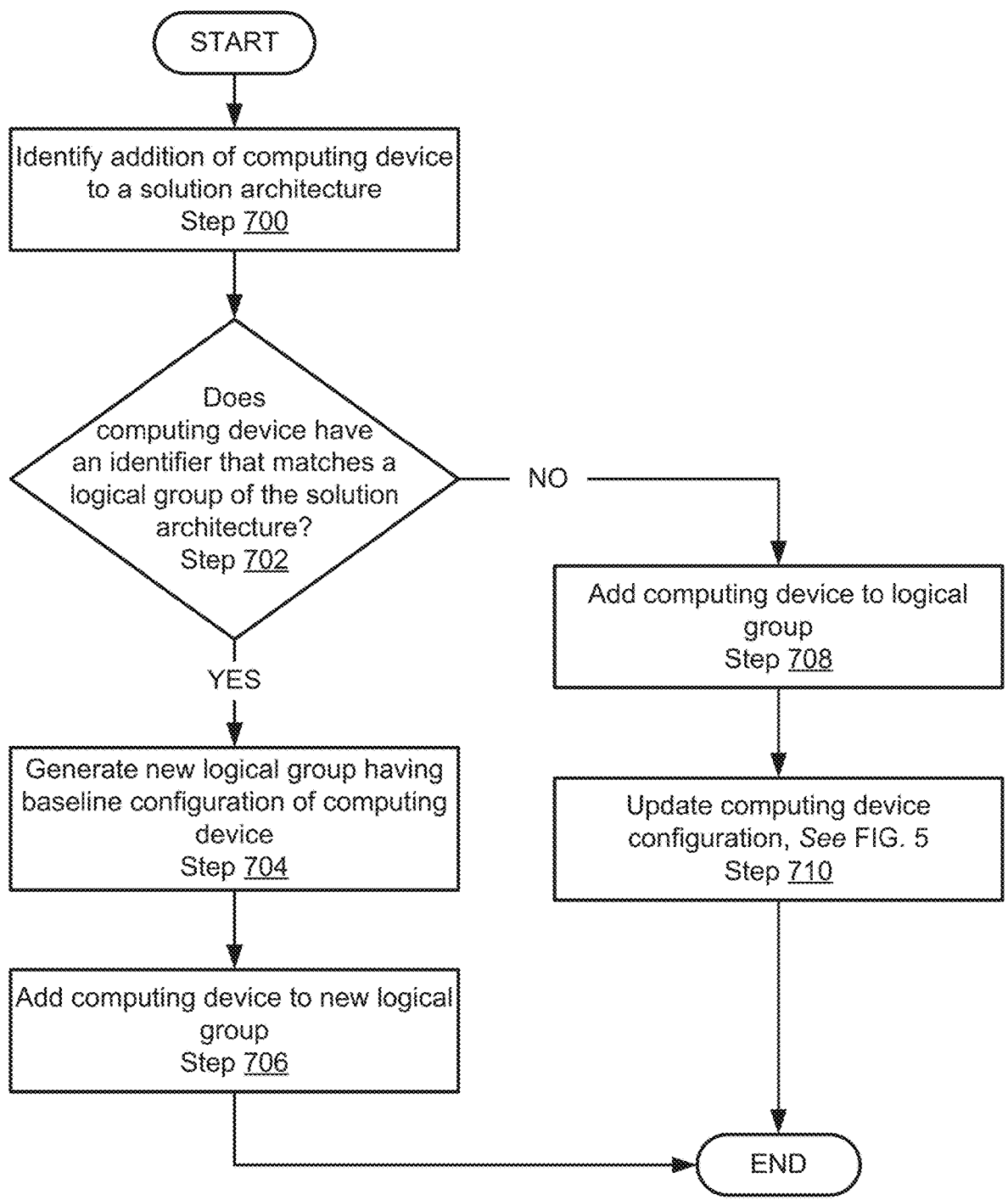
FIG. 7 shows a diagram of a flowchart of a method of adding a computing device to a solution architecture in accordance with one or more embodiments of the invention.

FIG. 7 shows a flowchart of a method in accordance with one or more embodiments of the invention. The method depicted in FIG. 7 may be used to add a computing device to a distributed system in accordance with one or more embodiments of the invention. The method shown in FIG. 7 may be performed by, for example, an example validation agent (300, FIG. 3) or an example coordination point (400, FIG. 4). Other component of the system illustrated in FIG. 1A may perform the method of FIG. 7 without departing from the invention.

In Step 500, an addition of a computing device to a solution architecture is identified.

In one or more embodiments of the invention, the addition is identified by other computing devices of the solution architecture. For example, when the added computing is powered up, it may communicate with other computing devices of the solution architecture. The solution architecture may include a distributed system including any number of computing devices.

In Step 702, it is determined whether the added computing device has an identifier that matches a logical group of the solution architecture.

The determination may be made by comparing an identifier of the computing device to logical groups of the solution architecture. Each logical group may specify identifiers of members of the group. If the identifier matches a specified identifier of a logical group, the added computing device may be a member of the logical group. If the identifier of the computing device does not match any identifier of any logical group, the added computing device may not be a member of any logical group.

If the identifier of the added computing device matches a logical group, the method proceeds to Step 704. If the identifier of the added computing device does not match any logical group, the method proceeds to Step 708.

In Step 704, a new logical group is generating having a baseline configuration of the configuration of the added computing device.

In Step 706, the added computing device is added to the new logical group.

The method may end following Step 706.

Returning to Step 702, if the identifier of the added computing device does not match any logical group, the method proceeds to Step 708.

In Step 708, the added computing device is added to the logical group to which its identifier matches.

In Step 710, the added computing device is updated.

In one or more embodiments of the invention, the computing device is updated via the method illustrated in FIG. 5. The computing device may be updated via other methods without departing from the invention.

In one or more embodiments of the invention, updating the added computing device includes configuring the user resources of the computing device. Configuring the user resources of the computing device may conform the user resources to a baseline configuration of the logical group to which the added computing device was added in Step 708.

The method may end following Step 710.

While the methods illustrated in FIG. 5-7 are shown as a series of steps, any number of the steps may be omitted, performed in parallel, performed in a different order, and/or performed repeatedly without departing from the invention.

Figure 8:
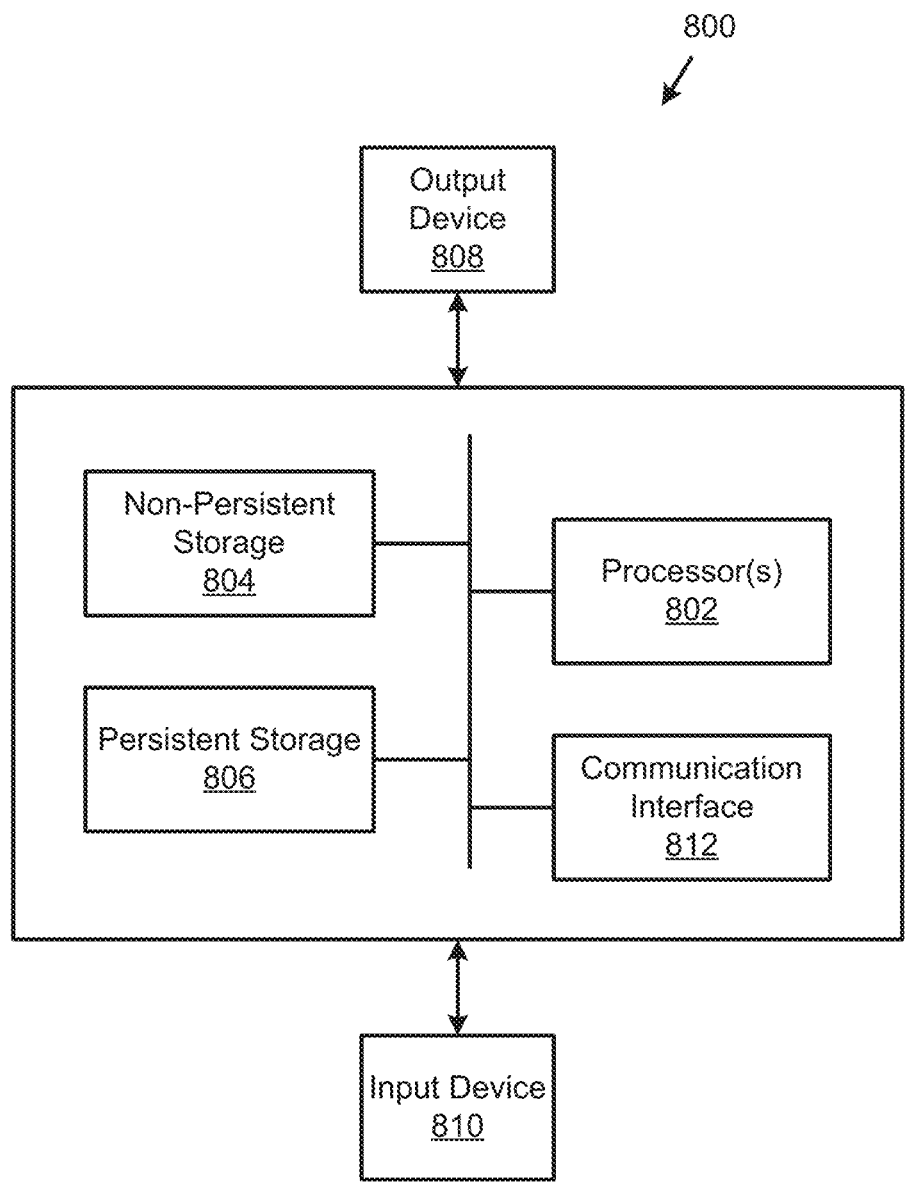
FIG. 8 shows a diagram of a computing device not hosting a validation agent in accordance with one or more embodiments of the invention.

As discussed above, embodiments of the invention may be implemented using computing devices. FIG. 8 shows a diagram of a computing device that does not host a validation agent in accordance with one or more embodiments of the invention. The computing device illustrated in FIG. 8 could also host a validation agent without departing from the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may improve the performance of computations, data storage, and/or communications in a network environment by configuring multiple computing devices of a distributed system. More specifically, embodiments of the invention may improve the performance of computations, data storage, and/or communications by ensuring that the configuration of user resources of computing devices are compatible with each other. For example, in a network environment, the speed of computation, rate of data storage, and bandwidth of communications is impacted by all components of the network. More particularly, in a network environment where the functionality of individual computing devices depends on the services provided by other computing devices the compatibility between user resources may directly impact the functionality of the computing devices.

Embodiments of the invention may ensure compatibility between computing devices by configuring the user resources of groups of computing devices similarly. Embodiments of the invention may further ensure compatibility between computing devices by automatically applying override parameters to baseline configurations based on the dependencies of computing devices within the group. By doing so, embodiments of the invention may ensure that each member of a logical group is similarly configured to ensure compatibility between the computing devices of the logical group. Accordingly, one or more embodiments of the invention address the problem of misconfiguration of computing devices in a distributed system that would otherwise reduce the performance of the distributed system. The aforementioned problem arises due to the nature of the technological environment in which distributed systems operate.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device, comprising:
   user resources; and
   a validation agent programmed to:
   identify a logical group of a solution architecture to which the computing device belongs;
   obtain a baseline configuration associated with the logical group;
   identify a dependency of the user resources on second user resources of a second computing device of the logical group;
   make a first determination that an override attribute is associated with the second user resources, wherein making the first determination comprises:
   comparing the obtained baseline configuration to a configuration of the second user resources;
   making a second determination, based on the comparing, that the configuration of the second user resources includes an attribute in conflict with a corresponding attribute of the obtained baseline configuration; and
   in response to the second determination, identifying that the attribute in conflict with the corresponding attribute of the obtained baseline configuration is the override attribute;
   modify the obtained baseline configuration using the override attribute; and
   initiate a modification of the user resources using the modified obtained baseline configuration.

2. The computing device of claim 1, wherein the modification of the user resources comprises:
   obtaining a configuration of the user resources;
   comparing the obtained configuration to the obtained baseline configuration;

identifying a difference based on the comparing; and
updating the user resources based on the identified difference.

3. The computing device of claim 2, wherein updating the user resources based on the identified difference comprises downgrading a firmware of a component of the user resources.

4. The computing device of claim 2, wherein updating the user resources based on the identified difference comprises disabling a hardware component of the user resources.

5. The computing device of claim 2, wherein updating the user resources based on the identified difference comprises disabling an application executing using a component of the user resources.

6. The computing device of claim 1, wherein the logical group specifies the dependency of the user resources on the second user resources of the second computing device.

7. The computing device of claim 6, wherein the user resources are functionally dependent on the second user resources for low performance data storage.

8. The computing device of claim 6, wherein the user resources are functionally dependent on the second user resources for high performance data storage.

9. The computing device of claim 1, wherein the solution architecture comprises a plurality of logical groups, wherein each logical group is functionally independent from each of the other logical groups of the plurality of logical groups.

10. A method for deploying a solution architecture, comprising:
    identifying a baseline configuration for a first computing device of the solution architecture;
    enforcing the baseline configuration on the first computing device;
    identifying an override attribute associated with a second computing device of the solution architecture;
    making a first determination that the first computing device and the second computing device are both members of a logical group;
    making a second determination that the first computing device depends on the second computing device in the logical group; and
    in response to the second determination:
        identifying a difference between a configuration of the second computing device and the baseline configuration; and
        using the identified difference as the override attribute;
    updating the baseline configuration based on the override attribute; and
    enforcing the updated baseline configuration on the first computing device and the second computing device.

11. The method of claim 10, wherein enforcing the baseline configuration on the first computing device comprises:
    reconfiguring a user resource of the first computing device by using an embedded computing device hosted by the first computing device.

12. The method of claim 10, further comprising:
    adding a third computing device to the solution architecture;
    identifying that the third computing device is a member of the logical group;
    making a determination that no computing device of the logical group depends on the third computing device; and
    enforcing the updated baseline configuration on the third computing device.

13. The method of claim 10, wherein the baseline configuration is associated with the logical group.

14. The method of claim 13, wherein the logical group specifies a dependency of the first computing device on the second computing device.

15. A non-transitory computer readable medium comprising computer readable program code, which when executed by a computer processor enables the computer processor to perform a method for deploying a solution architecture, the method comprising:
    identifying a baseline configuration for a first computing device of the solution architecture;
    enforcing the baseline configuration on the first computing device;
    identifying an override attribute associated with a second computing device of the solution architecture;
    making a first determination that the first computing device and the second computing device are both members of a logical group;
    making a second determination that the first computing device depends on the second computing device in the logical group; and
    in response to the second determination:
        identifying a difference between a configuration of the second computing device and the baseline configuration; and
        using the identified difference as the override attribute;
    updating the baseline configuration based on the override attribute; and
    enforcing the updated baseline configuration on the first computing device and the second computing device.

16. The non-transitory computer readable medium of claim 15, wherein enforcing the baseline configuration on the first computing device comprises:
    reconfiguring a user resource of the first computing device by using an embedded computing device hosted by the first computing device.

17. The non-transitory computer readable medium of claim 16, wherein enforcing the updated baseline configuration on the first computing device comprises:
    reconfiguring only a single resource of user resources of the first computing device corresponding to a single resource of user resources of the second computing device on which the override attribute is based.

18. The non-transitory computer readable medium of claim 15, wherein the baseline configuration is associated with the logical group.

* * * * *